US006462500B1

(12) United States Patent
L'Hegarat et al.

(10) Patent No.: US 6,462,500 B1
(45) Date of Patent: Oct. 8, 2002

(54) OPERATING TABLE CONTROL SYSTEM AND OPERATING TABLE COMPRISING SUCH A SYSTEM

(75) Inventors: Jean-Marie L'Hegarat; Daniel Bedoure, both of Olivet; Philippe Rocher, Orleans, all of (FR)

(73) Assignee: Alm, Ardon (FR)

( * ) Notice: Subject to any disclaimer, the term of this patent is extended or adjusted under 35 U.S.C. 154(b) by 255 days.

(21) Appl. No.: 09/593,763

(22) Filed: Jun. 14, 2000

(30) Foreign Application Priority Data

Apr. 27, 2000 (FR) .......................................... 00 05394

(51) Int. Cl.[7] .......................... A61G 13/02; G10L 15/00

(52) U.S. Cl. ............................ 318/649; 5/600; 108/20; 704/246; 381/110

(58) Field of Search .......................... 318/16, 560, 567, 318/568.1, 600, 601, 649; 5/600, 612, 616; 108/20; 704/200, 231, 243, 246; 381/110; 340/825.3, 825.31, 825.34

(56) References Cited

U.S. PATENT DOCUMENTS 4,766,529 A * 8/1988 Nakano et al. .......... 364/513.5
5,335,313 A 8/1994 Douglas
5,809,476 A * 9/1998 Ryan ............................ 705/2
5,884,350 A 3/1999 Kurze

FOREIGN PATENT DOCUMENTS

DE 30 32 693 A1 5/1982
EP 1 010 404 A2 6/2000
WO 93/23003 11/1993

* cited by examiner

*Primary Examiner*—Bentsu Ro
(74) *Attorney, Agent, or Firm*—Young & Thompson

(57) ABSTRACT

The control system comprises a microphone (7) linked to a receiver block (9) and delivering audio signals to a discriminating block (11) comparing the voice profile of the speaker with a particular authorized speaker profile recorded in a personal chip card (20) of the speaker.

The authorized audio signals are then processed in a voice recognition device and an electronic control unit so as to selectively activate one of the actuators (3) of the operating table in response to a specific voice command uttered into the microphone and effected by an effector (16) actuated by the speaker.

14 Claims, 2 Drawing Sheets

OPERATING TABLE CONTROL SYSTEM AND OPERATING TABLE COMPRISING SUCH A SYSTEM

The present invention relates to the control of the displacement of at least one part of an operating table.

Operating tables are nowadays controlled using remote control boxes, of the wire or infrared transmission type, and, conventionally, using pedals which work in tandem with or supplement the remote control.

Remote controls, especially of the wireless type, are easy to use but necessitate assistance from the surgical team, with the problems relating to the availability of these latter, the accessibility of the control and above all the asepsis of the remote control box.

The object of the present invention is to propose an operating table voice control system which circumvents the problems relating to assistance and asepsis whilst being very safe to implement.

To do this, according to the invention, there is proposed a system for controlling at least one displacement, under the effect of an actuator, of at least one part of an operating table, comprising, in series: at least one microphone, an individual voice profile discriminating device, a voice recognition device, and an electronic control unit actuating the actuator in response to a voice command uttered into the microphone.

With such a system, a surgeon, duly authorized and registered, can control, on his own and with total safety, all the movements of the table, without requiring the help of a third party, even in a noisy environment.

Figure 1:
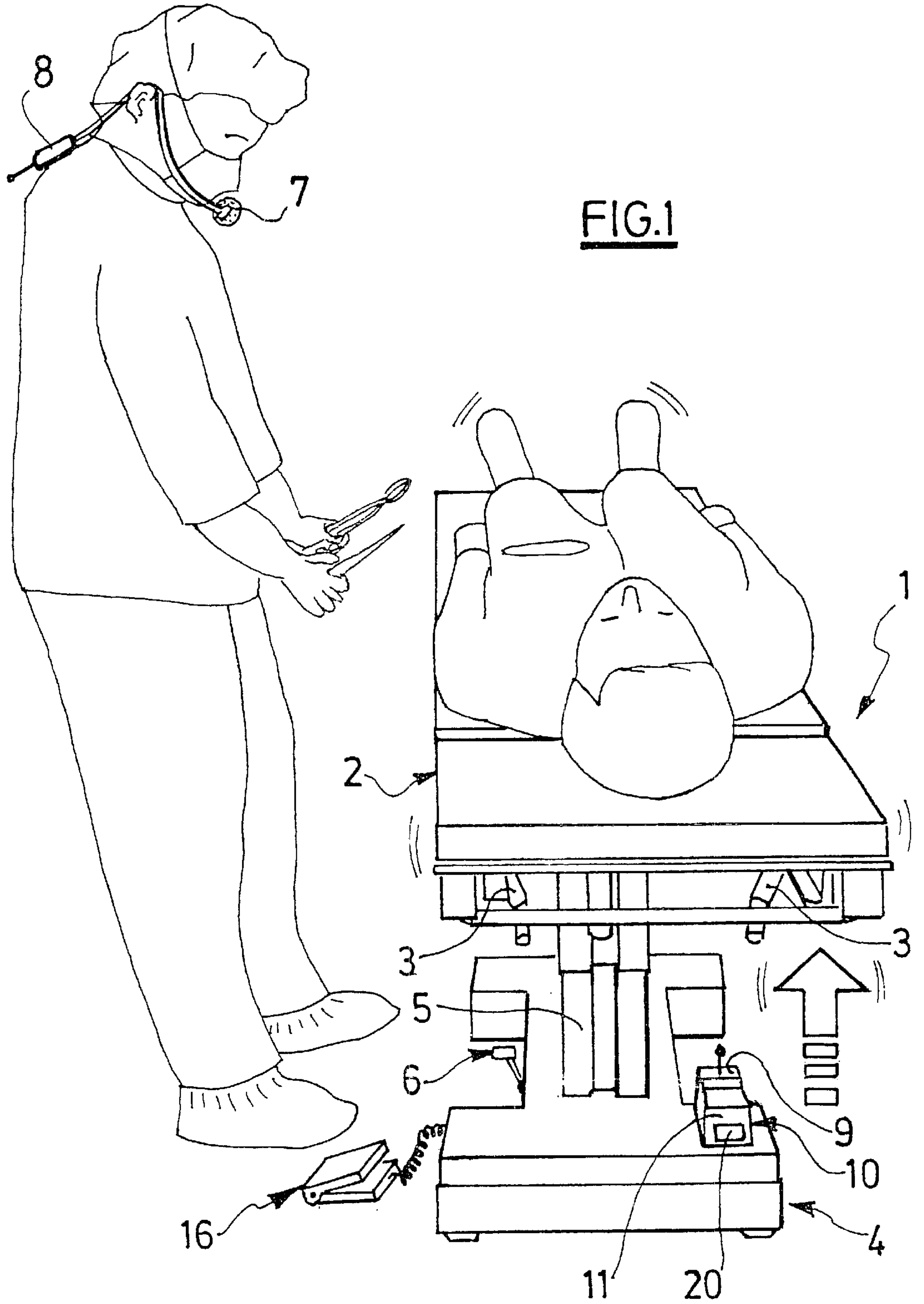
Figure 2:
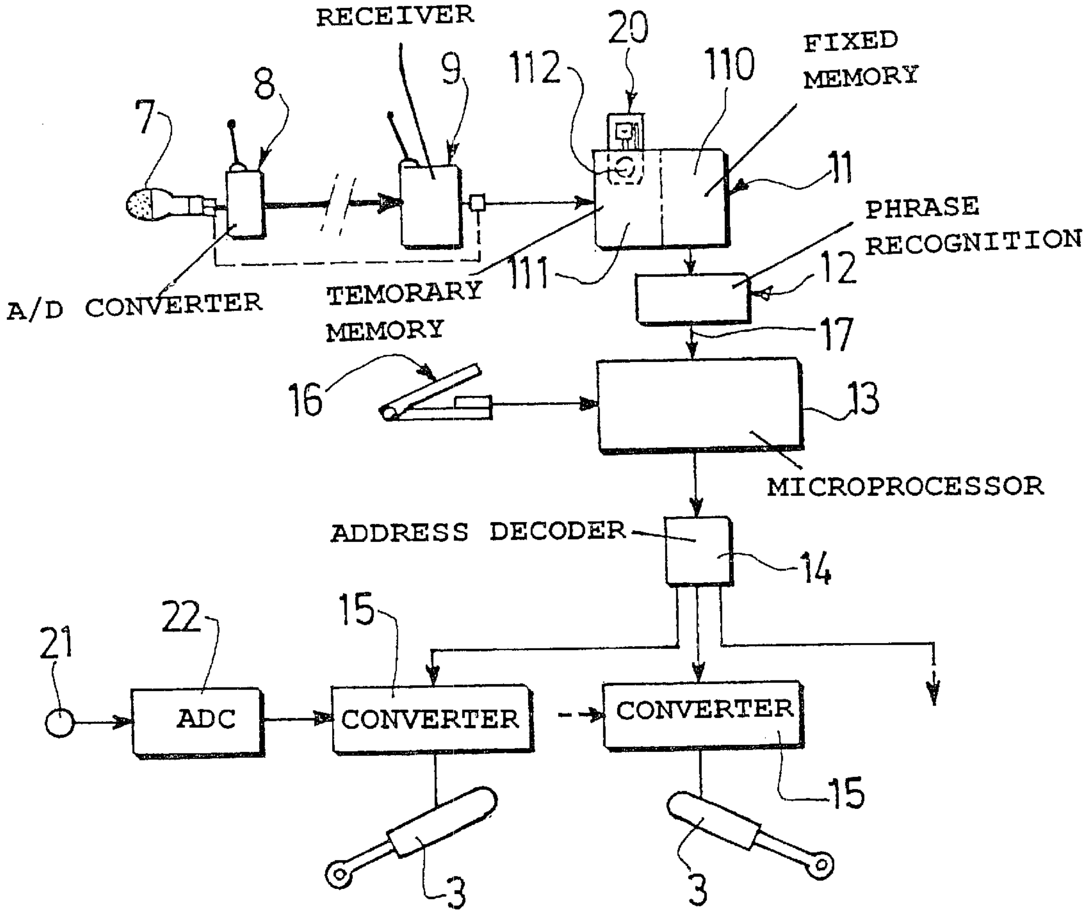

The present invention will be better understood in the light of the following description of an embodiment, given by way of wholly non-limiting illustration, and in conjunction with the appended drawings, in which:

FIG. 1 is a schematic representation of a use of an operating table fitted with a control system according to the invention; and FIG. 2 is a block diagram of a voice control system according to the invention.

In FIG. 1 there may be seen the principal elements of a modern operating table 1, namely a top 2 consisting of several parts articulated with respect to one another under the effect of actuating rams 3, and a base 4 supporting the top 2 via a telescopic column 5 incorporating at least one up/down ram and up/down sensors. At least part of the movements of the table can be controlled directly by at least one pedal 6 supported by the base 4.

With reference also to FIG. 2, the control system according to the invention comprises a microphone 7 supported by a practitioner and linked, advantageously over the airwaves, preferably in digital mode, via a transmitter-analogue/digital converter 8 and a receiver 9 which is associated with the table 1, to a control box 10 containing a discriminating block 11, a phrase recognition block 12 linked to a microprocessor 13 outputting the signals transmitted to an address decoder 14 so as to transmit the control signals to converters, typically digital/analogue converters 15 each controlling an actuator or ram 3.

The control system furthermore comprises an effector pedal 16 linked to the microprocessor 13 and actuated by the practitioner in order to effect the voice commands and ensure, under priority processing, with immediate response, the STOP function.

Since all the voice instructions are directly transformed and processed in digital, problems of interference with the numerous electromagnetic sources within an operating theatre are virtually eliminated.

According to one aspect of the invention, the discriminating block 11 comprises a writable fixed memory area 110 and a temporary memory area 111 of which at least a part of the memory is advantageously constituted by a chip 112 of a chip card 20, personalized for each user, inserted into the block 10.

The system functions as follows:

The user utters selected words or short phrases into the microphone 7 (UP/DOWN/STOP THAT/START THAT AGAIN/STOP/, etc.). The spectra of the words and phrases thus uttered are analysed in the discriminator 11 by comparison with typical words pre-recorded by the user in the card 20 so that the words or phrases uttered will reach the phrase recognition block 12 only if the block 11 recognizes a similarity to within at least 95% of the profile of the voice of the speaker talking into the microphone 7 with the profile prerecorded in the card 20.

The phrase recognition block 12, comprising software such as that marketed by the company LEXTRONIC, using neural technology, compares the words uttered with significant words of recorded commands and digitizes these words in the form of signals addressed to the microprocessor 13 which, in a process of grammatical type, determines whether the words correspond to control commands for one or other of the particular actuators 3. If such is the case and if an effector signal has been transmitted by the pedal 16, the processor 13 transmits a signal which is correlated in the address decoder 14 with the corresponding actuator 3, which receives an analogue control signal translated from the output signal from the microprocessor by the relevant digital/analogue converter 15.

In addition to voice controls, controls for backup directly via the pedal 6, or instead of some of these, signals for halting manoeuvres can be addressed to the converters 15 from position or load detection sensors 21 delivering analogue signals converted in analogue/digital converter circuits 22 into signals addressed to the converters 15.

Also as a variant, as represented by the dashed link and the connection 17 in FIG. 2, the processing devices 11 and 12 can be grouped together within a block integrated with the microphone 7 which can thus be customized for each practitioner, thus making it possible to circumvent the linguistic problems of the various practitioners, keywords, in various languages, being standardized and those actually used and vocalized into the "personalized" microphone being written onto a numbered chart associated with the microphone.

Although the invention has been described in connection with a particular embodiment, it is not limited thereto but is open to modifications and variations which will be apparent to the person skilled in the art within the framework of the claims which follow.

What is claimed is:

1. System for controlling at least one displacement, under the effect of an actuator (3), of at least one part of an operating table (1), comprising, in series: a microphone (7), a voice profile discriminating device (11), a voice recognition device (12), and an electronic control unit (13) actuating the actuator in response to a voice command uttered into the microphone.

2. System according to claim 1, characterized in that it comprises an effector (16), which can be actuated by the speaker, linked to the electronic control unit (13) for effecting the voice command.

3. System according to claim 2, characterized in that the effector (16) is a pedal.

4. System according to claim 3, characterized in that the discriminating device (11) comprises at least one first memory area (111) for an identification of an individual voice.

5. System according to claim 4, characterized in that the first memory area comprises at least one portion of the transportable removable type (112).

6. System according to claim 5, characterized in that said transportable removable memory portion is carried by a chip card (20).

7. System according to claim 2, characterized in that the discriminating device (11) comprises at least one first memory area (111) for an identification of an individual voice.

8. System according to claim 7, characterized in that the first memory area comprises at least one portion of the transportable removable type (112).

9. System according to claim 8, characterized in that said transportable removable memory portion is carried by a chip card (20).

10. System according to claim 1, characterized in that the discriminating device (11) comprises at least one first memory area (111) for an identification of an individual voice.

11. System according to claim 10, characterized in that the first memory area comprises at least one portion of the transportable removable type (112).

12. System according to claim 11, characterized in that said transportable removable memory portion is carried by a chip card (20).

13. System according to claim 1, characterized in that it comprises at least one sensor (21) for tracking the displacement of the actuator (3).

14. Operating table equipped with a control system according to claim 1.

* * * * *